US006912815B1

(12) United States Patent
Koehler et al.

(10) Patent No.: US 6,912,815 B1
(45) Date of Patent: Jul. 5, 2005

(54) METHODS AND DEVICES FOR IMPEDING CRAWLING ARTHROPODS FROM ENTERING ENCLOSED AND SEMI-ENCLOSED SPACES

(75) Inventors: Philip G. Koehler, Gainesville, FL (US); Richard S. Patterson, Gainesville, FL (US); Ernest H. Roberts, Elyria, OH (US)

(73) Assignee: University of Florida, Gainesville, FL (US)

( * ) Notice: Subject to any disclaimer, the term of this patent is extended or adjusted under 35 U.S.C. 154(b) by 246 days.

(21) Appl. No.: 10/010,533

(22) Filed: Dec. 7, 2001

Related U.S. Application Data

(63) Continuation-in-part of application No. 09/750,831, filed on Dec. 28, 2000.
(60) Provisional application No. 60/181,395, filed on Feb. 9, 2000.

(51) Int. Cl.[7] .............................................. A01K 3/00
(52) U.S. Cl. ...................................................... 52/101
(58) Field of Search ........................................ 52/101

(56) References Cited

U.S. PATENT DOCUMENTS

| | | | | |
|---|---|---|---|---|
| 3,705,938 A | | 12/1972 | Hyman ......................... | 424/19 |
| 3,864,468 A | | 2/1975 | Hyman ......................... | 424/16 |
| 4,102,991 A | | 7/1978 | Kydonieus .................... | 424/27 |
| 5,274,950 A | | 1/1994 | Roberts ........................ | 43/121 |
| 5,506,834 A | * | 4/1996 | Sekihata et al. ............. | 370/253 |
| 5,596,834 A | * | 1/1997 | Ritter ........................... | 43/124 |
| 5,758,457 A | * | 6/1998 | Achen .......................... | 52/198 |
| 6,230,435 B1 | * | 5/2001 | Carman ........................ | 43/108 |
| 6,417,450 B1 | * | 7/2002 | Young .......................... | 174/66 |
| 6,478,587 B2 | * | 11/2002 | Sharples ...................... | 439/131 |

FOREIGN PATENT DOCUMENTS

GB  472883  10/1937

OTHER PUBLICATIONS

Public Website pages on Syngenta Products, IMPASSE application, labels and MSDS as printed on Feb. 16, 2004.

Trademark, IMPASSE, filed Mar. 14, 1997 as intent–to–use Trademark, starting first date of use Aug. 1, 2002, Registration No. 75257676 Registered Jul. 15, 2003, as printed from United States Patent and Trademark Office on Feb. 16, 2004.

Syngenta Media Release Aug. 2, 2001.

Syngenta Media Release Oct. 10, 2002.

* cited by examiner

*Primary Examiner*—Carl D. Friedman
*Assistant Examiner*—Steve Varner
(74) *Attorney, Agent, or Firm*—Brian S. Steinberger; Law Office of Brian S. Steinberger, P.A.

(57) ABSTRACT

Gasket devices having a crawling arthropod deterring substance for fitting adjacent to connection points to permanent fixture objects on walls, ceilings and floors to interior spaces. The novel gasket devices can be used for protecting gaps and spaces between permanent fixtures such as shower heads, faucets, drainpipes, incoming waterlines into various rooms such as but not limited to bathrooms and/or kitchens, and anywhere these fixtures exist. Additionally, the gasket devices can be used for protecting gaps and spaces between other permanent fixtures such behind plates such as but not limited to electrical sockets, switches, cables, telephone jacks thermostats, and the like. Additionally, the gasket devices can be used behind ventilation vent covers, and the like. Finally, the gasket covers can be used about wall mounted stems of on hanging fixtures such as lights, chandeliers, and ceiling fans, and the like.

19 Claims, 14 Drawing Sheets

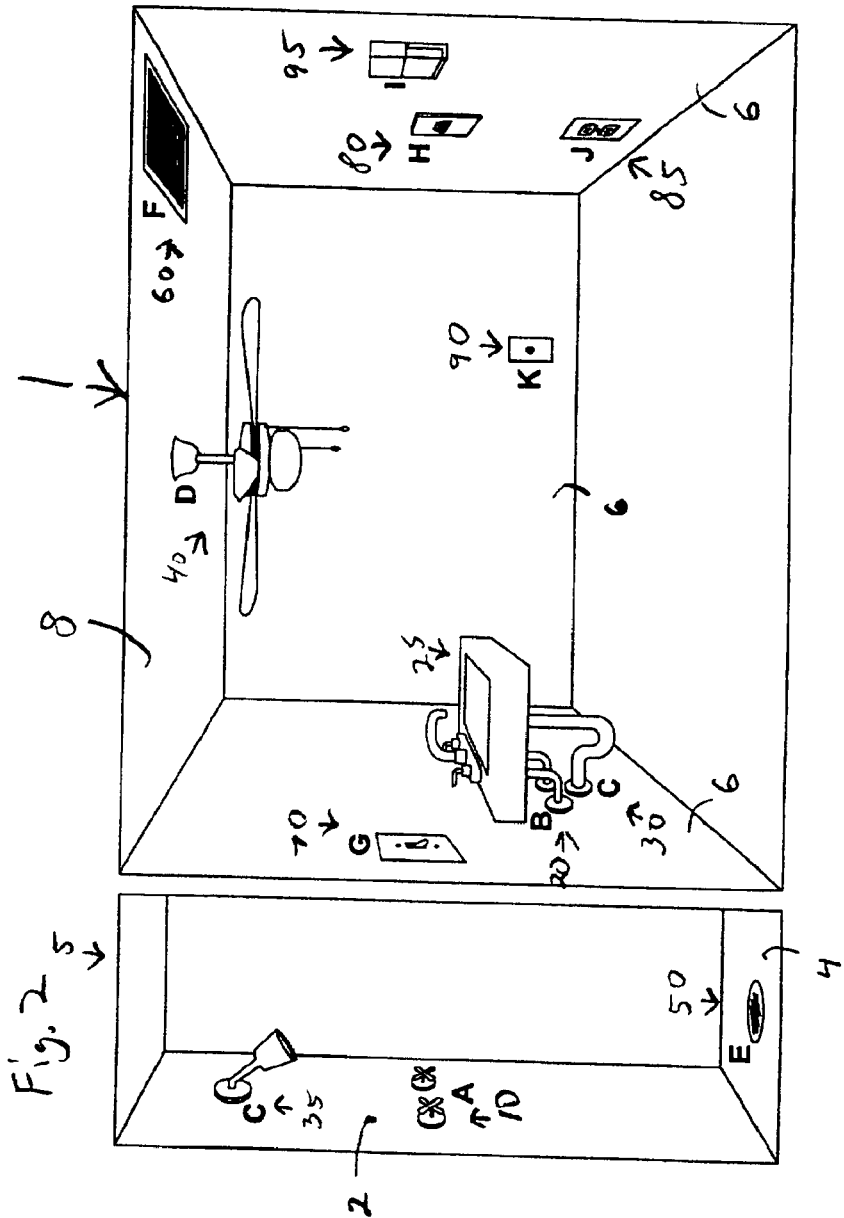

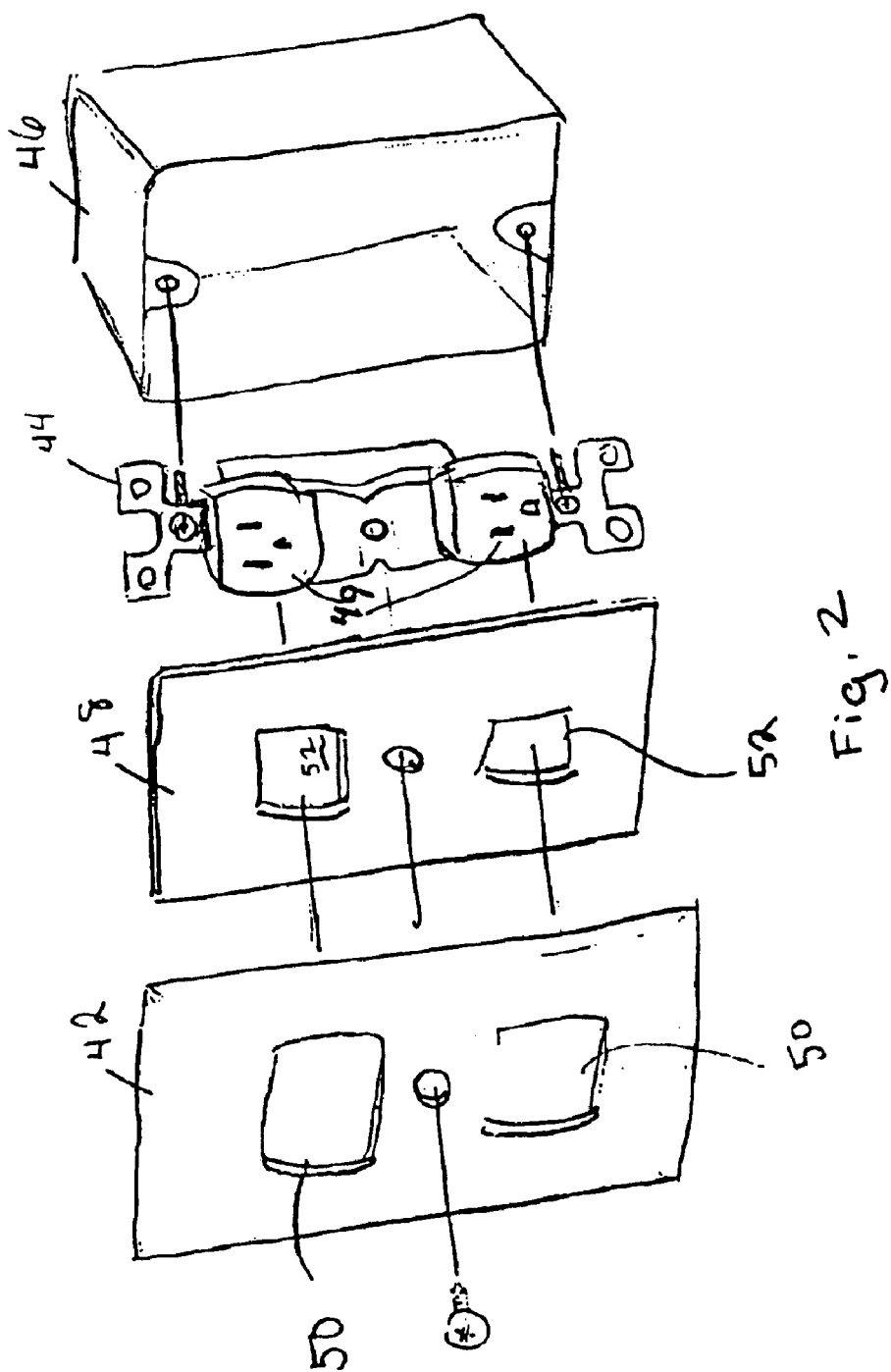

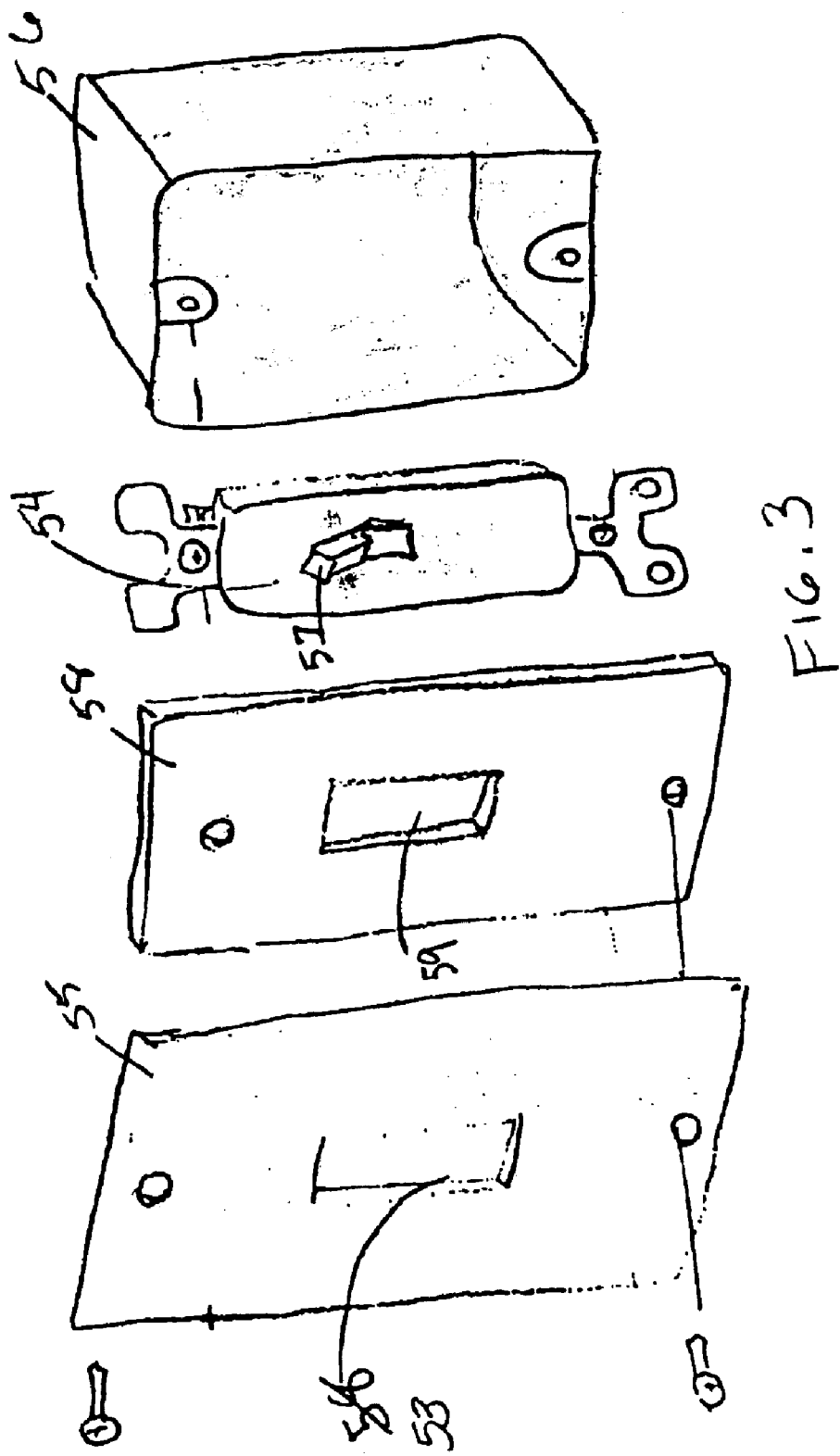

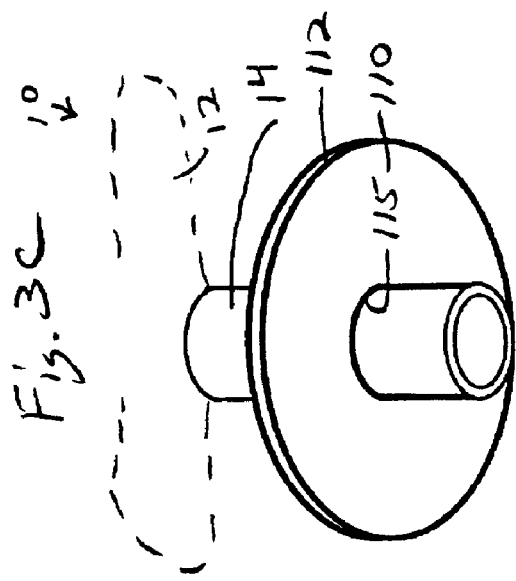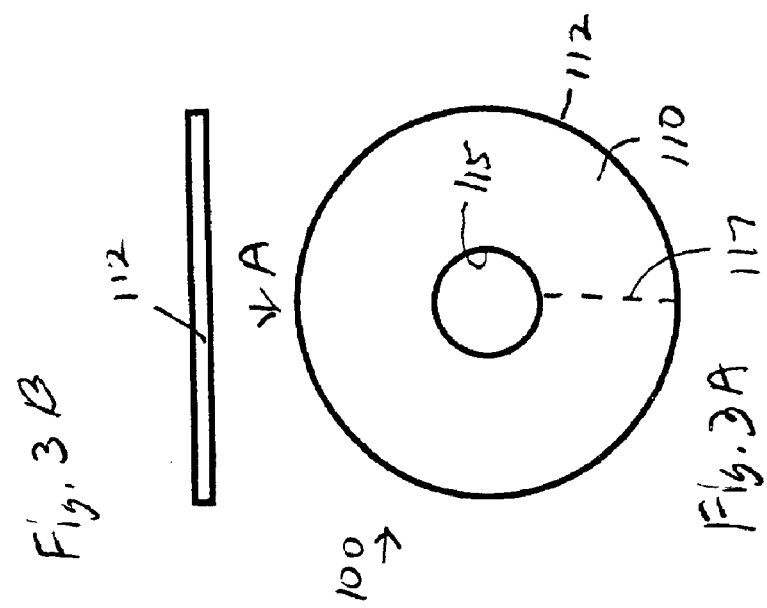

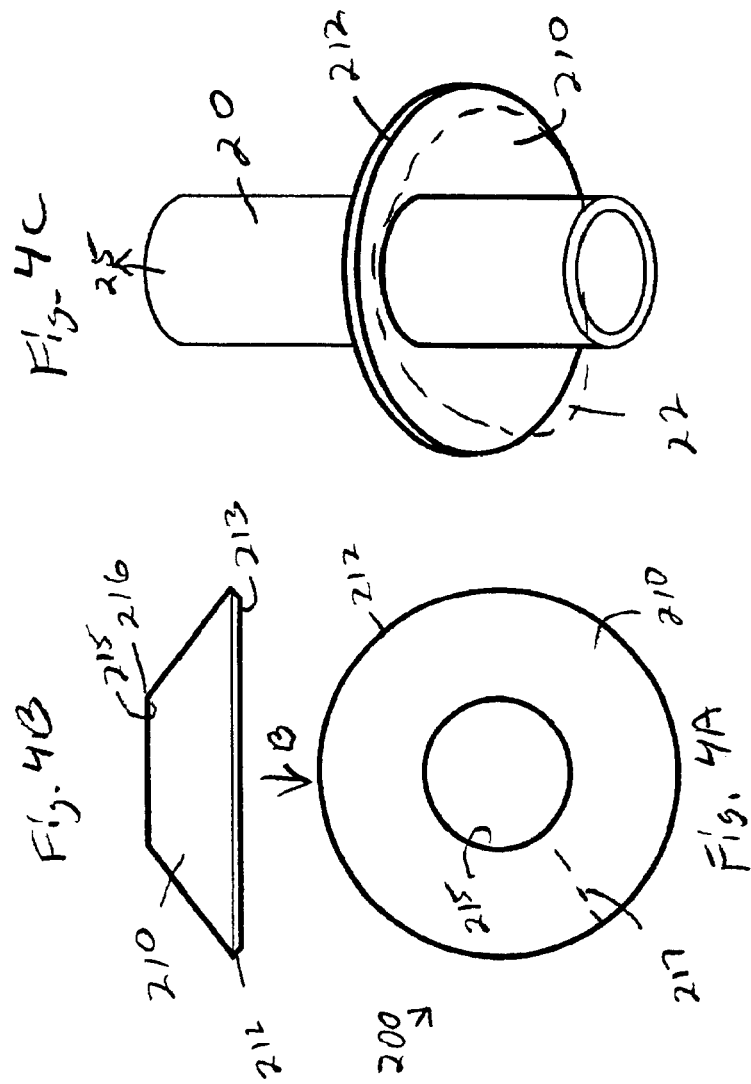

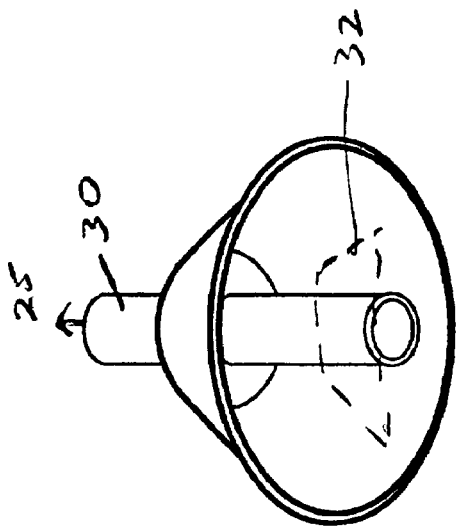
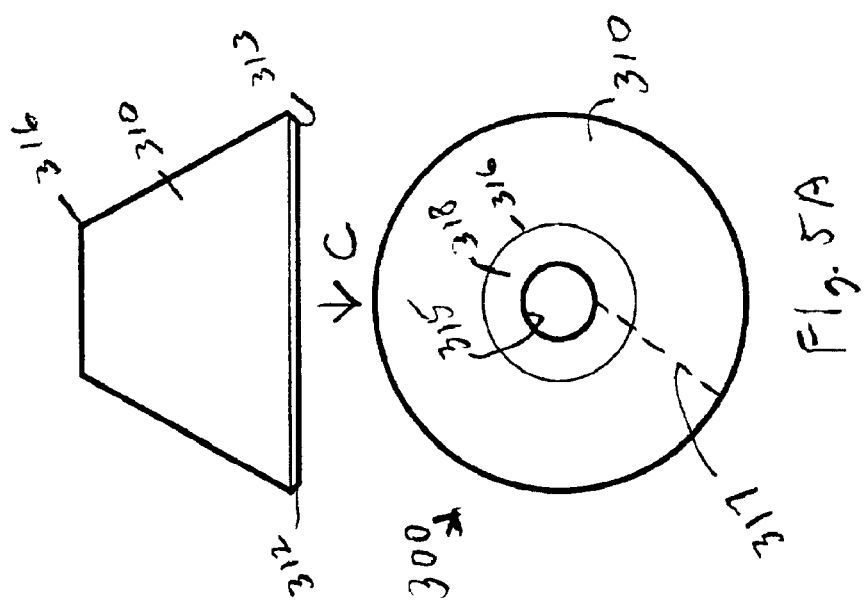

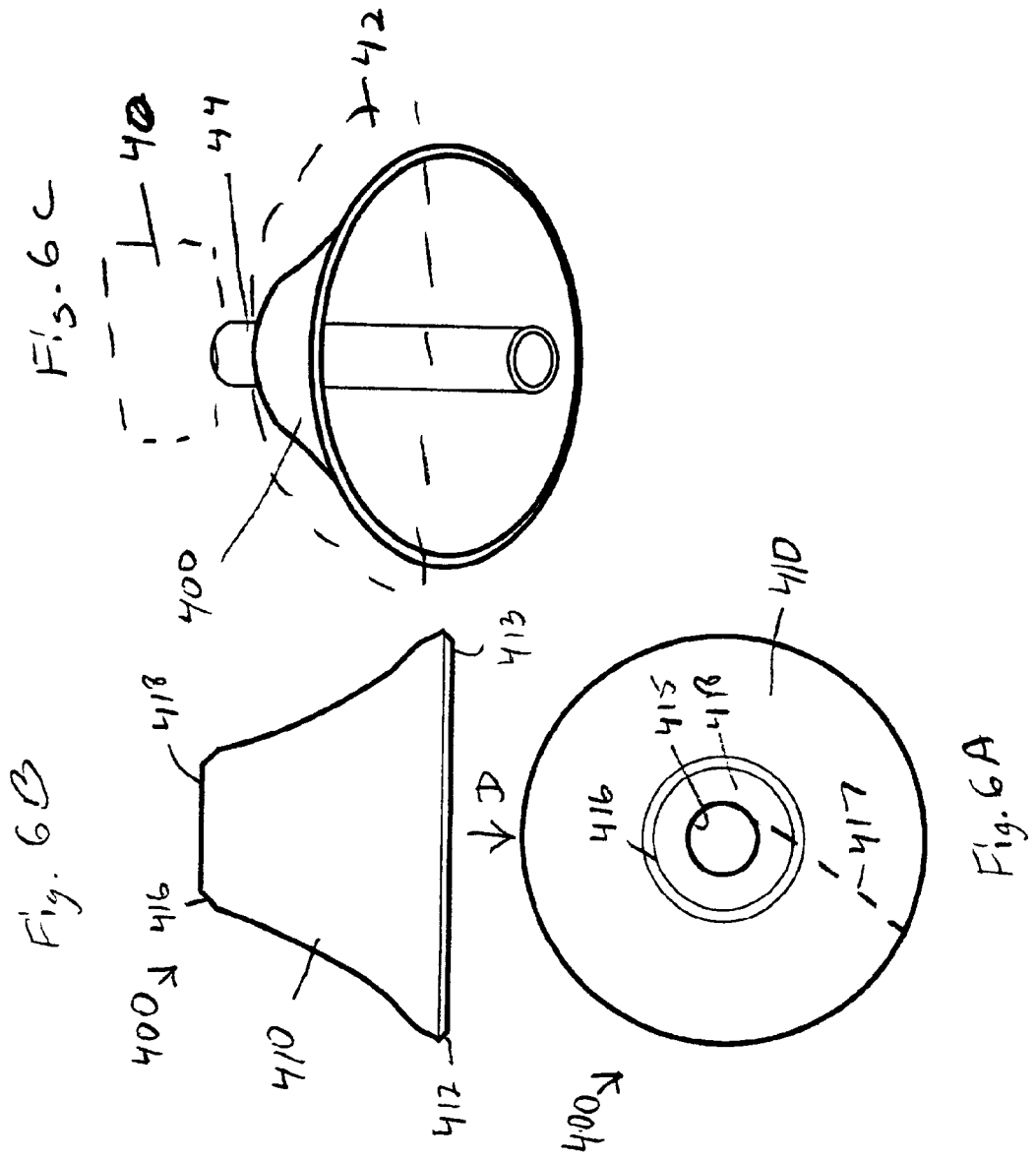

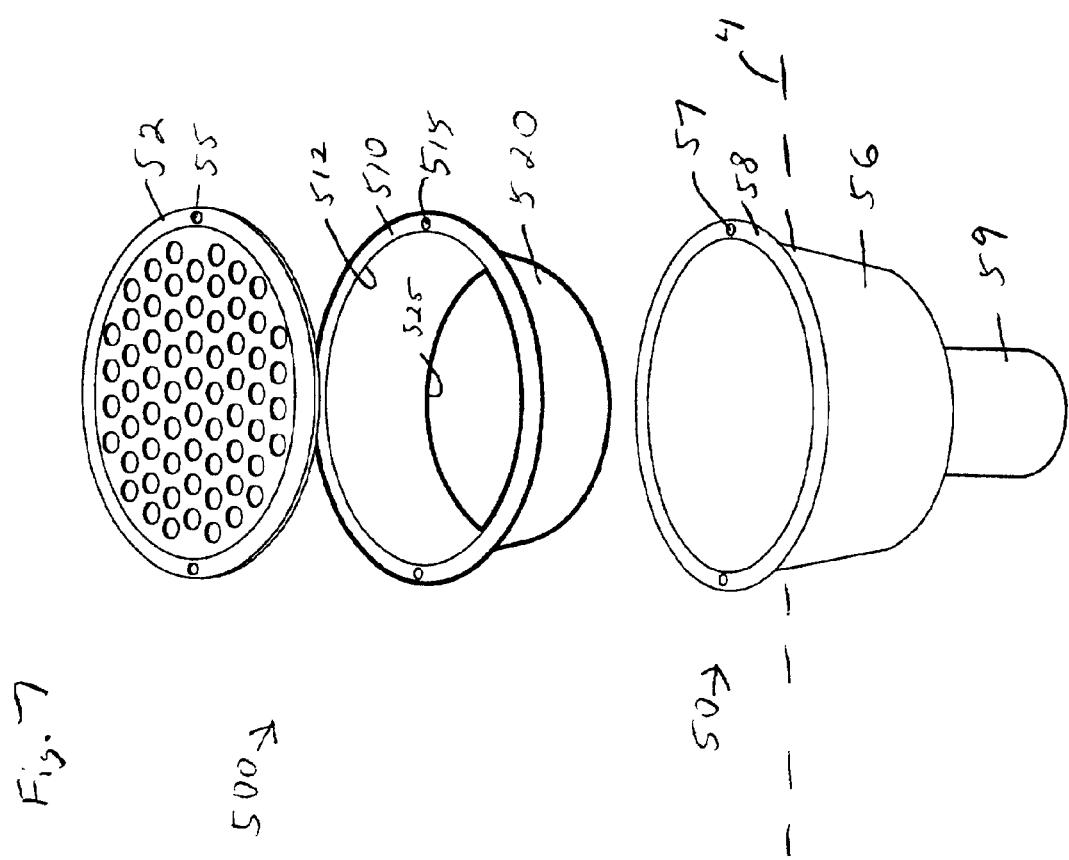

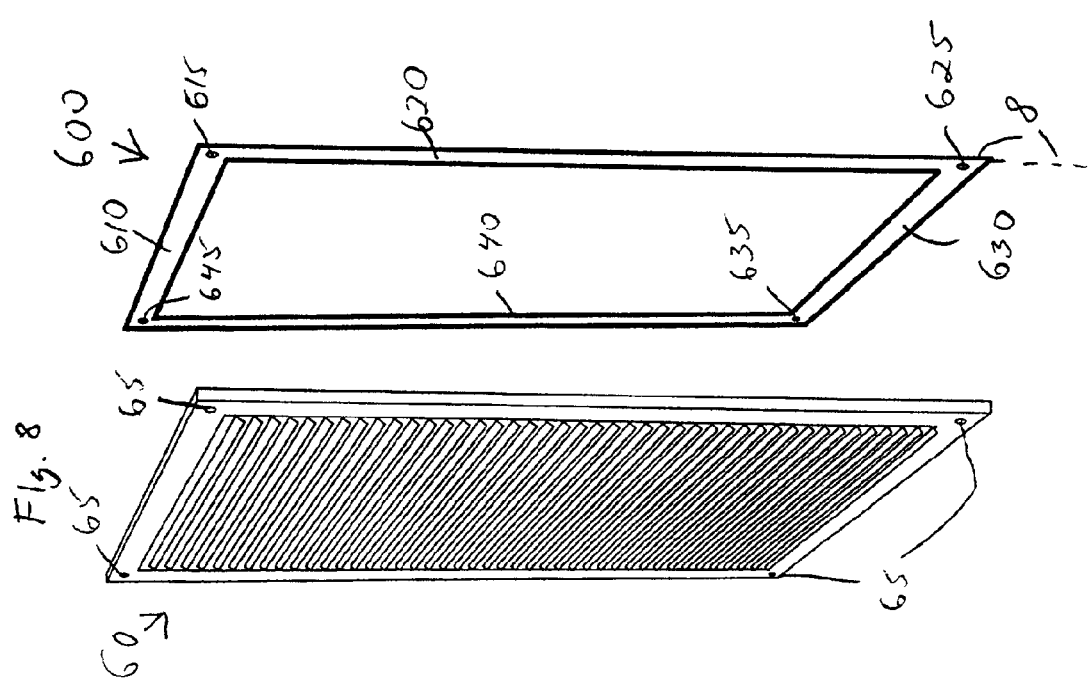

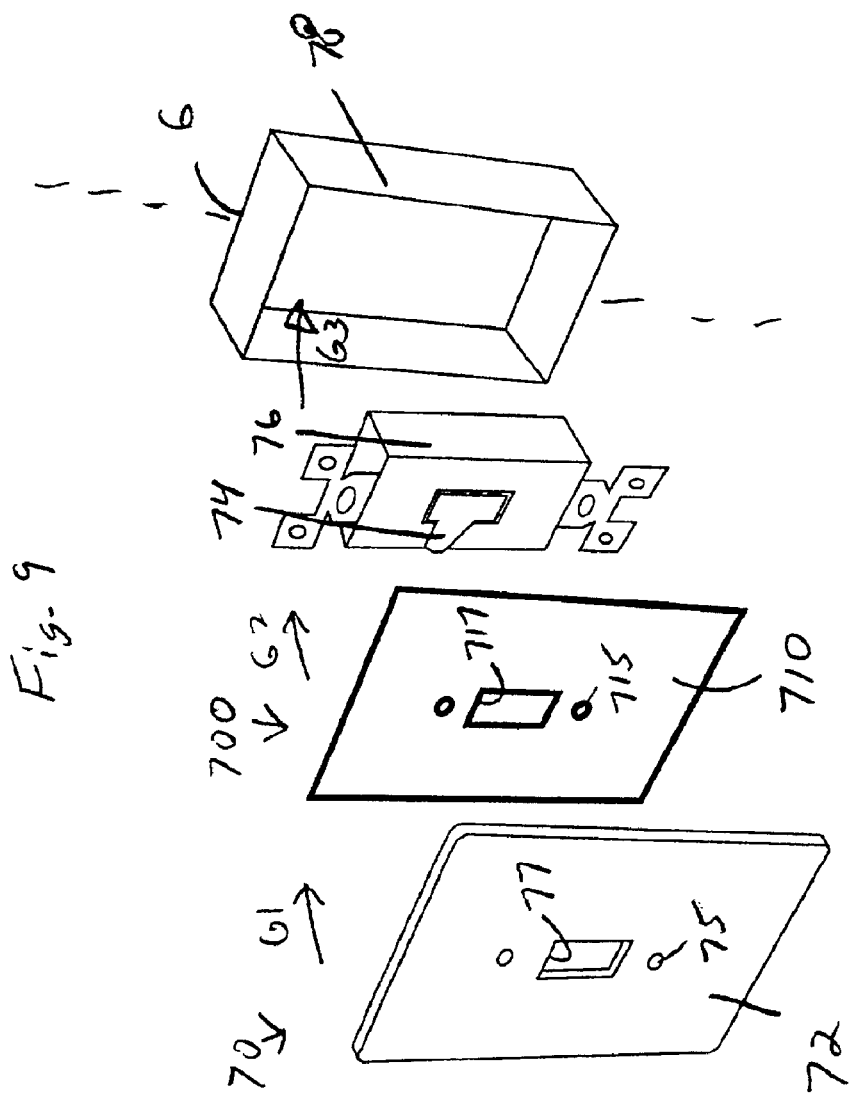

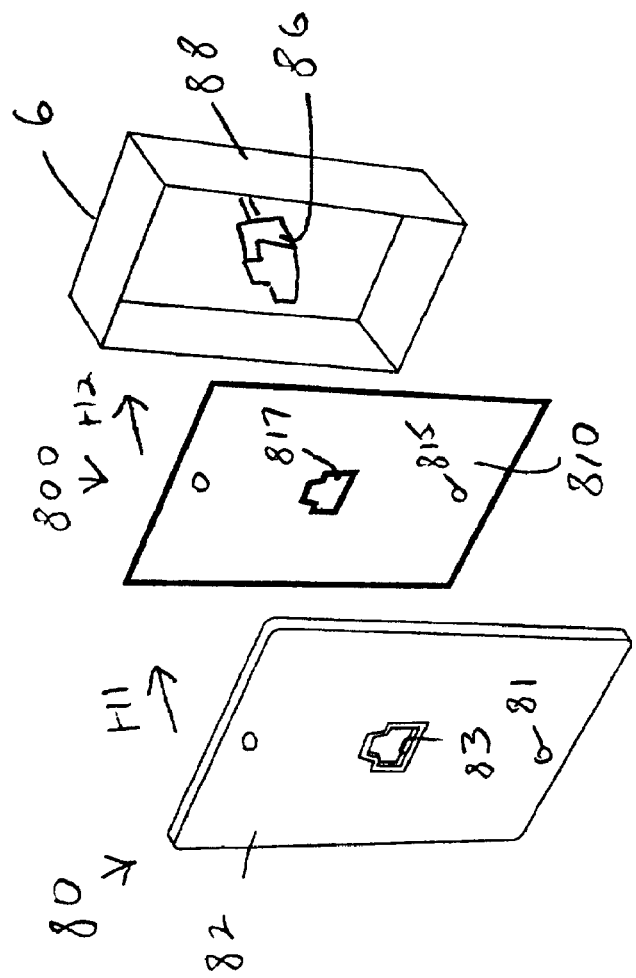

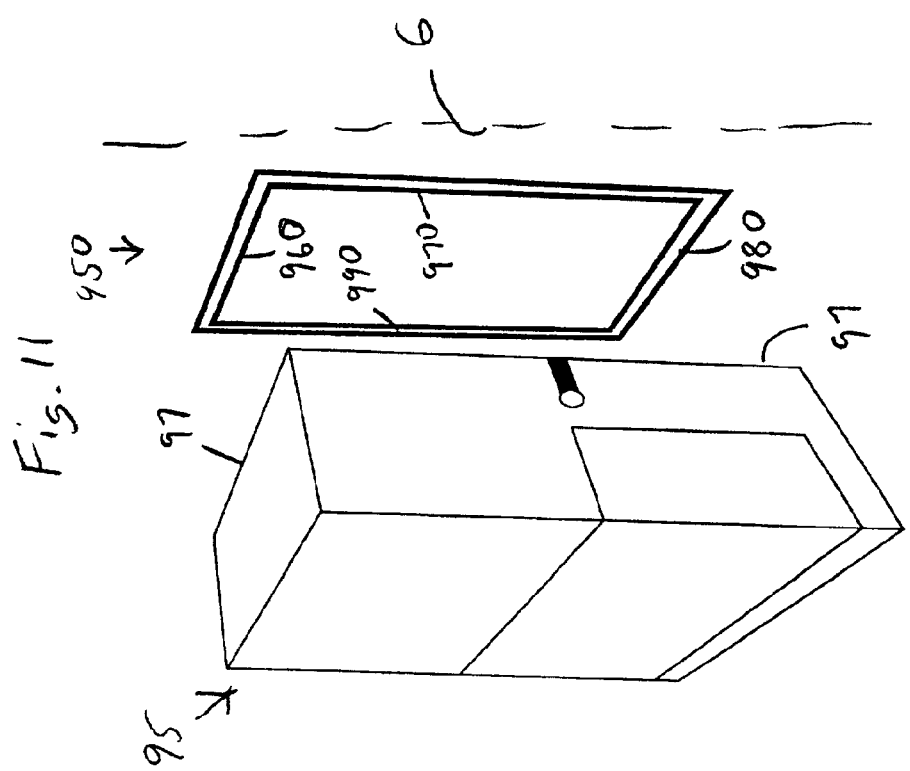

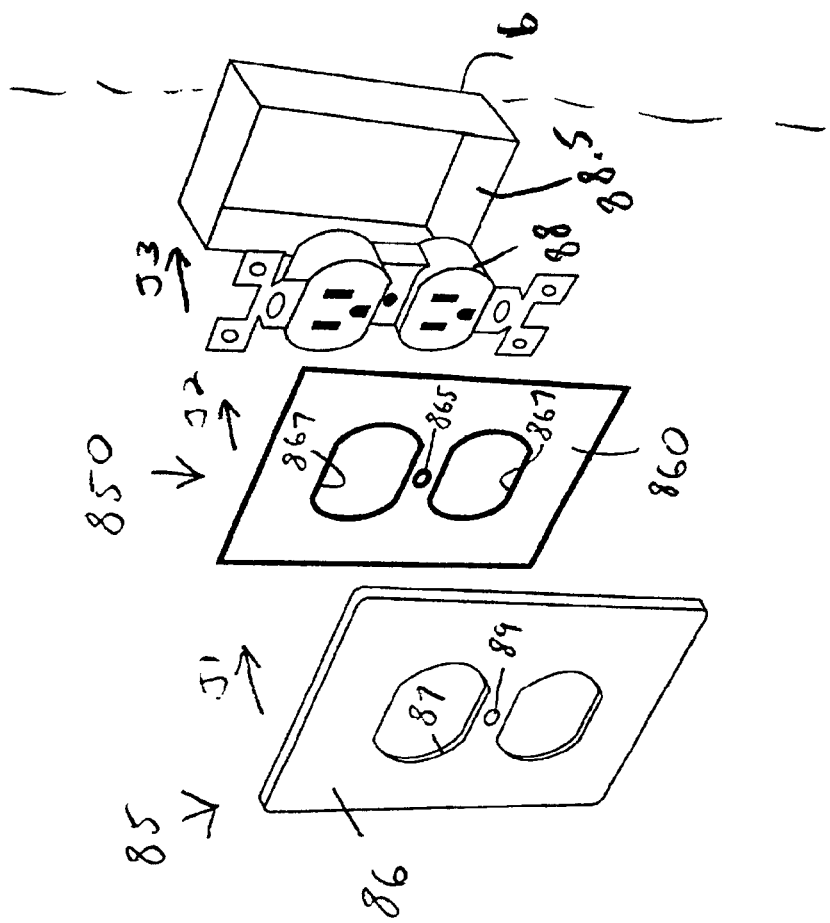

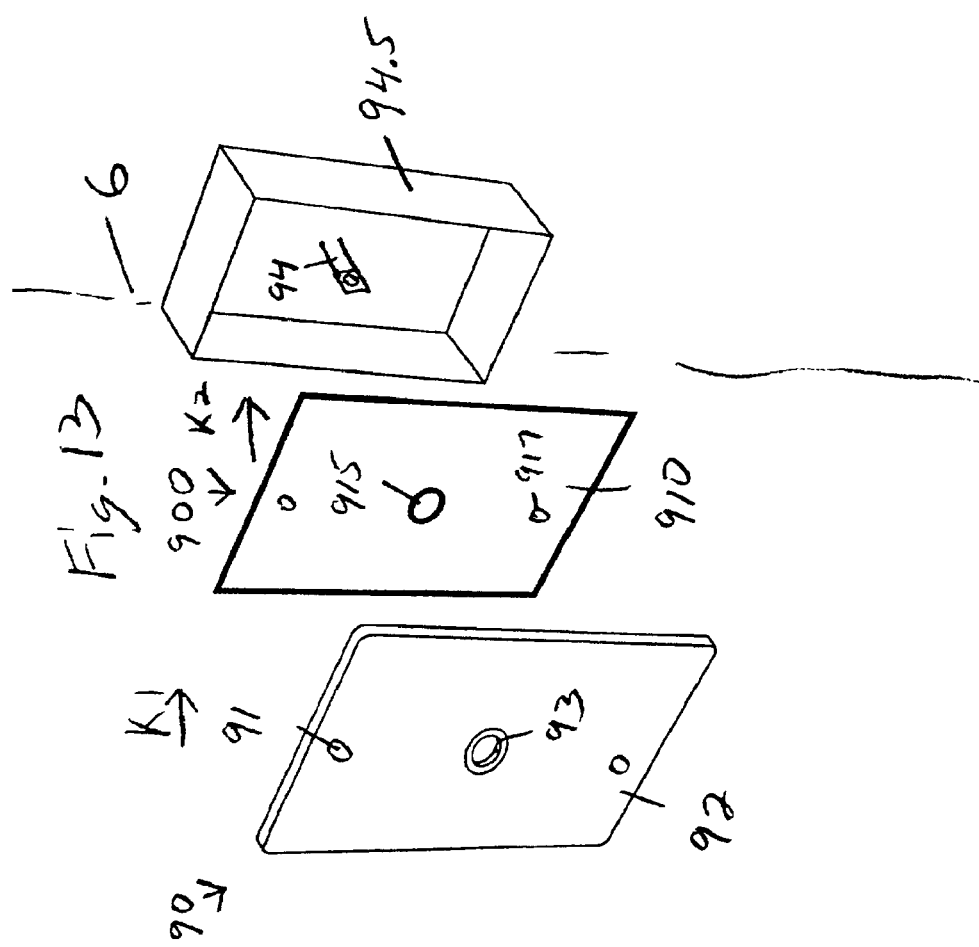

METHODS AND DEVICES FOR IMPEDING CRAWLING ARTHROPODS FROM ENTERING ENCLOSED AND SEMI-ENCLOSED SPACES

This invention relates to pest control, and in particular to methods and devices that impede arthropods from entering through travel routes into enclosed and semi-enclosed spaces, and this invention is relate Co-Pending application Ser. No. 10/010,422 filed Dec. 7, 2001 concurrently with this application, and this invention is a Continuation-In-Part of U.S. application Ser. No. 09/750,831 filed Dec. 28, 2000, which claims priority from U.S. Provisional Application Ser. No. 60/181,395 filed Feb. 9, 2000, which are all incorporated by reference.

BACKGROUND AND PRIOR ART

Arthropods such as ants and roaches, are a known pest that can invade inside spaces of residences, commercial buildings, and the like. The arthropods often enter the inside spaces through various openings such as receptical openings, switches and switch plates, along pipe flanges, around plumbing fixtures, ventilation outlets, and any other gap in the walls, ceilings, and floors of an enclosed space.

In addition to their unsightly appearance, arthropods can clog passageways. After entering an enclosed space arthropods can be seen traveling on all surfaces from walls, ceilings, and floors to chairs, desks and tabletops creating a nuisance everywhere they go. They can form nests in most areas within an enclosed space.

As a health hazard, they can spread disease and filth by their traveling from one location to another location. In addition, arthropods can bring dirt, sand, food, and waste products into the enclosed spaces and leave fecal matter in their place.

Warmer and wetter climates such as Florida and large crowded cities such as New York City tend to breed greater amounts of arthropods such as cockroaches and ants. In particular in Florida, fire ants are a known nuisance that often sting unsuspecting humans causing painful bites and sores requiring hospital care. And in some cases for example, where there is an allergic reaction, injury and even death has been known to occur from the fire ant bites. Arthropods, especially ants, have also been a problem in hospitals, healthcare facilities, and nursing homes, in addition to residential and commercial buildings.

Widely known techniques such as pesticidal powders as well as liquid and spray pesticides such as those found in bug sprays tend to offer short-term relief. These known techniques often must be reapplied over and over again in large quantities to be effective. Thus, the repetitive use of applying known pesticides can also be an expensive and time-consuming endeavor. Great care for handling toxic pesticide sprays and liquids such the requirements of: using gloves and/or masks; not coming into contact with the chemicals; not breathing the fumes; and the like. In addition, applying powders, sprays and liquids disseminates toxic chemicals from the pesticides into the atmosphere which can cause discomfort and dangers to humans that come into contact with the those chemicals. Furthermore, powders, sprays and liquids can stain and damage items within the enclosed space such as furniture surfaces and wall coverings.

Thus, the need exists for solutions to the above problems.

SUMMARY OF THE INVENTION

The primary object of the invention is to provide relatively inexpensive methods and devices for impeding the travel of crawling arthropods from entering into an enclosed space such as a room, where they are ready made and sized for various applications.

The secondary object of the invention is to provide long-lasting and long residual lifespan methods and devices for impeding the travel of crawling arthropods from entering into an enclosed space such as a room. The invention can be applied and kept in place as effective impediment for up to several years before being replaced.

The third object of the invention is to provide easily useable methods and devices for impeding the travel of crawling arthropods from entering into an enclosed space such as a room. No special skills need to be used, and no special handling such the care that is used with pesticide powders, liquids and sprays needs to be done.

The fourth object of the invention is to provide easily removable methods and devices for impeding the travel of crawling arthropods from entering into an enclosed space such as a room.

The fifth object of the invention is to provide relatively nontoxic methods and devices for impeding the travel of crawling arthropods from entering into an enclosed space such as a room, when the methods and devices are properly used. The novel invention methods and devices can be safely handled by humans without always the need for gloves and masks.

The sixth object of the invention is to provide methods and devices for impeding the travel of crawling arthropods from entering into an enclosed space such as a room, that do not breakdown upon contact with water.

The seventh object of the invention is to provide methods and devices for impeding the travel of crawling arthropods from entering into an enclosed space such as a room that can also function as airflow barriers for closing spaces and gaps into and/or out of the enclosed space where such spaces and gaps occur.

The eighth object of the invention is to provide methods and devices for impeding the travel of crawling arthropods from entering into an enclosed space such as a room, that acts as a barrier in the enclosed space, thus reducing air conditioning and/or heating expenses.

The ninth object of the invention is to provide inexpensive methods and devices for impeding the travel of crawling arthropods from entering into an enclosed space such as a room, that reduces or eliminates the infiltration of air or drafts into the enclosed spaces, closing spaces and gaps along outside walls.

The tenth object of the invention is to provide methods and devices for impeding the travel of crawling arthropods from entering into an enclosed space such as a room, that acts as a moisture barrier preventing humidity and moisture, from entering and/or exiting into and/or out of the enclosed space.

The eleventh object of the invention is to provide methods and devices for impeding the travel of crawling arthropods from entering into an enclosed space such as a room, whose effects do not break down upon becoming in contact with moisture and water.

The twelfth object of the invention is to provide inexpensive methods and devices for impeding the travel of crawling arthropods from entering into an enclosed space such as a room. This can work in conjunction with or as a potential substitute for existing approved pest control methods, thus making better pest control within enclosed space, such as a room.

The thirteenth object of the invention is to provide an arthropod deterring substance molded within the pliable gasket material which has a slow release capability for repelling or deterring arthropods from passing beyond the point of entry.

The fourteenth object of the invention is to provide an arthropod deterring substance and gasket material that can reduces and/or eliminates allergy effects resulting from insects and pesticides and pollutants existing outside of a structure by helping seal the structure against those effects.

Novel embodiments of arthropod deterring gaskets and gasket inserts include those for various applications including plumbing pipes, about faucet lines, in drainpipes, and the like. Additional novel arthropod deterring gaskets and gasket inserts are for applications such with electrical wall switch covers, cable wall jack covers, telephone wall jack covers, vent covers, thermostats, ceiling fan mounts, and the like. The novel gaskets and gasket inserts can be used on top of, and/or behind existing covers, and outside of or behind the walls, as needed.

Further objects and advantages of this invention will be apparent from the following detailed description of a presently preferred embodiment which is illustrated schematically in the accompanying drawings.

BRIEF DESCRIPTION OF THE FIGURES

FIG. 1 is a perspective side view of a room enclosed space housing the novel invention embodiments.

FIG. 2 is a perspective side view a shower enclosed space housing the novel invention.

FIG. 3A shows a front view of the flat gasket insert that can be used about the shower faucet handles of FIG. 2.

FIG. 3B is a side view of the gasket insert of FIG. 3A along arrow A.

FIG. 3C is an enlarged perspective view of the gasket insert of FIGS. 3A–3B on the stem of faucet handle.

FIG. 4A is a bottom view of a small conical gasket insert that can be used about the incoming water pipe lines beneath the sink in the room enclosure of FIG. 1.

FIG. 4B is a side view of the conical gasket insert of FIG. 4A along arrow B.

FIG. 4C is an enlarged perspective view of the gasket insert of FIGS. 4A–4B on the incoming water pipelines beneath the sink of FIG. 1.

FIG. 5A is a bottom view of a large conical gasket insert that can be used about the drain pipe lines under the sink in the room enclosure of FIG. 1.

FIG. 5B is a side view of the conical gasket insert of FIG. 5A along arrow C.

FIG. 5C is an enlarged perspective view of the gasket insert of FIGS. 5A–5B on the drain pipe line under the sink in FIG. 1.

FIG. 6A is a top view of a bell gasket insert that can be used about the mounting stem supporting the ceiling fan/light shown in FIG. 1.

FIG. 6B is a side view of the bell gasket insert of FIG. 6A along arrow D.

FIG. 6C is an enlarged perspective view of the gasket insert of FIGS. 6A–6B about the mounting stem.

FIG. 7 is an enlarged exploded view of a floor or drain gasket insert for use with the shower floor drain of FIG. 2.

FIG. 8 is an enlarged exploded view of the air vent gasket insert that can be used about the air vent shown in FIG. 1.

FIG. 9 is an enlarged exploded view of the wall switch gasket insert that can be used with the wall switch plate shown in FIG. 1.

FIG. 10 is an enlarged exploded view of the telephone gasket insert that can be used with the telephone wall plate shown in FIG. 1.

FIG. 11 is an enlarged exploded view of the thermostat gasket insert that can be used with the wall thermostat shown in FIG. 1.

FIG. 12 is an exploded view of the electrical receptical gasket that can be used with the electrical receptical shown in FIG. 1.

FIG. 13 is an enlarged exploded view of the cable wall gasket insert that can be used with the cable wall plate shown in FIG. 1.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

The invention can be used with impeding the travel routes of various types of arthropods, such as but not limited to crawling insects such as ants, cockroaches, silver fish, earwigs, weevils, flower beetles, centipedes, millipedes, spiders, scorpions, and the like. Additionally, the invention can be used to inhibit the traveling of bed bugs, and the like.

The invention helps block the progression of arthropods attempting to enter an enclosed space such as any type of room in a residential and/or commercial building.

The invention utilizes a barrier material in gasket type shapes, that are preferably formed from a pliable flexible polymer material such as but not limited to a moldable PVC polymer with an arthropod repelling substance imbedded within the material. The arthropod repellant substance can include but not limited to pyrethoid, and the like, which is generally intended to function as a repellant, and not as an immediate killing substance. The repellant substance can leach out of the pliable material over time, and last up to approximately several years or more without being replaced.

The gaskets which will be described in reference to the Figures, can use a pliable material having a thickness of approximately 1/32 inches(1 mil) to approximately 1/64 inches(2 mil) thick.

FIG. 1 is a perspective side view of a room enclosed space I housing the novel invention embodiments. Space 1 can be any room in a building such as but not limited to a livingroom, bedroom, kitchen, apartment, office, and the like, for housing various fixtures such as but not limited to sink incoming waterline(s) 20, sink drain 30, ceiling fixture 40 such as but not limited to a ceiling fan, light, combinations thereof, and the like, air vent 60, wall power switch 70, telephone jack 80, wall power receptical 85, cable jack 90 and thermostat 95.

FIG. 2 is a perspective side view a shower enclosed space 5 housing the novel invention embodiments for use with fixtures such as but not limited to a shower faucet(s) 10, shower head 35 and drain 50.

FIG. 3A shows a front view of the flat gasket insert 100 that can be used adjacent to the shower faucet handles 10 of FIG. 2. FIG. 3B is a side view of the gasket insert 100 of FIG. 3A along arrow A. FIG. 3C is an enlarged perspective view of the gasket insert 100 of FIGS. 3A–3B on the stem 14 of faucet handle 12.

Referring to FIGS. 2, 3A–3C, gasket insert 100 can include a thin flat and disk shape 110 having a rounded perimeter edge 1 12, and a through-hole 1 15 therethrough for allowing the gasket 100 to wrap about the stem 14 to a faucet handle 12. An optional precut or perforated line 117 can allow the gasket to more easily slip over the stem 14 without having to remove the faucet handle. Gasket 100 can be positioned on the interior wall surface 2 of room 5 or behind the wall 2.

FIG. 4A is a bottom view of a small conical gasket insert 200 that can be used about the incoming water pipe lines 20 beneath the sink 25 in the room enclosure of FIG. 1. FIG. 4B is a side view of the conical gasket insert 200 of FIG. 4A along arrow B. FIG. 4C is an enlarged perspective view of the gasket insert 200 of FIGS. 4A–4B on the incoming water pipeline(s) 20 beneath the sink 25 of FIG. 1.

Referring to FIGS. 1, 4A–4C, gasket insert 200 can include a conical shape with an enlarged bottom edge 212 that can be slightly beveled about a large bottom opening 213, inwardly sloping sides 210 and top edge 216 about a smaller upper opening 215. The gasket insert 200 can fit about the incoming water pipeline 20 beneath sink 25. If existing capcover 22 such as an existing aesthetic conical cover exists at this location, the gasket insert 200 can fit underneath the existing cap cover 22 and wall 6, or over the existing cap cover and the wall 6. An optional precut or perforated line 217 can allow the gasket 200 to more easily slip over the line 20.

FIG. 5A is a bottom view of a large conical gasket insert 300 that can be used about the drain pipe lines 30 under the sink 25 in the room enclosure 1 of FIG. 1. FIG. 5B is a side view of the conical gasket insert 300 of FIG. 5A along arrow C. FIG. SC is an enlarged perspective view of the gasket insert 300 of FIGS. 5A–5B on the drain pipe line 30 under the sink 25 in FIG. 1.

Referring to FIGS. 1, 5A–5C, gasket 300 can include a conical shape with an enlarged bottom edge 312 that can be slightly beveled about a larger bottom opening 313, inwardly sloping sides 310 and a top edge 316, with a flat disc shaped top 318 with a central through-hole 315 therethrough. The gasket insert 300 can fit about the drain pipe line 30 beneath sink 25. If an existing cap cover 32 such as an aesthetic cover already exists at this location, the gasket insert 300 can fit over cap cover 32 or under cap cover 32 to be between cap cover 32 and the wall 6. For larger sized drain pipes 30, the flat top disc 318 can be removed to enlarge the upper opening to upper edge 316. For example, pre-perforations existing about edge 316 would allow the opening to be enlarged as needed. An optional precut or perforated line 317 can allow the gasket to more easily slip over the drain line 30. Additionally, insert 300 can be used with water lines 20, and alternatively insert 200(of the preceding embodiment) can be used with drain pipe(s) 30. Although the drain line 30 and water line 20 are shown coming out of the wall 6, the invention can be used with drain lines and water lines coming out of floors, and ceilings as well.

FIG. 6A is a top view of a bell gasket insert 400 that can be used about the mounting stem 10 supporting the ceiling fan/light 40 shown in FIG. 1. FIG. 6B is a side view of the bell gasket insert 400 of FIG. 6A along arrow D. FIG. 6C is an enlarged perspective view of the gasket insert 400 of FIGS. 6A–6B about the mounting stem 44.

Referring to FIGS. 1, 6A–6C, gasket 400 can include a bell shaped outer side 410 with enlarged bottom edge 412 that can be slightly beveled about a large bottom opening 413, bell shaped sides 41 and a top outer edge 416 that can also be beveled, with a flat disc shaped top 418 and a through-hole 415 therethrough. Gasket insert 400 can fit about an existing mounting stem 40 above an electrical fixture 40 such as a ceiling fan, light, and the like, and combinations, thereof. Gasket 400 can fit over an existing cap cover 42 or between the cap cover 42 and the ceiling 8. For larger sized mounting stems 44, the flat top disc 418 can be removed to enlarge the upper opening to upper edge 416. For example, pre-perforations existing about edge 416 would allow the opening to be enlarged as needed. An optional precut or perforated line 417 can allow the gasket 400 to more easily slip over stem 44 without having to re-moved the fixture 40. Although the figures show fixtures 400 attached to-a ceiling, the gasket 400 can be used with wall and floor supported fixtures also having sterns and/or supports that extend into a room space.

FIG. 7 is an enlarged exploded view of a floor or drain gasket insert 500 for use with the shower floor drain of FIG. 2. Drain insert 500 is hollow and includes an upper cylindrical rim 510, with through-holes 515, and a cup shaped bottom 520 having inwardly sloping sides to the bottom open end. Referring to FIGS. 2 and 7, drain insert 500 can fit within a conventional drain 50 having a drain cover screen plate 52 over a catch type basin 56 that can have a rim portion 58 with drain cover connector through-holes 57. A conventional type drain pipe 59 can extend from under catch basin 56. Conventional fasteners such as screws, and the like can pass through drain cover screen plate fastener holes 55 into the rim through-holes 515 and into catch basin through-holes 57 to attach each of the components together. The inner edge 512 of the rim can include perforations for allowing the rim 510 to be used by itself in case the cup shaped bottom 520 is not being used. Although the drain gasket insert 500 is shown in a floor drain 50, the drain gasket can be used for other drains such as but not limited to sink drains, bathtub drains, and the like, and any other indoor and outdoor drains.

FIG. 8 is an enlarged exploded view of the air vent gasket insert 600 that can be used about the air vent 60 shown in FIG. 1. Gasket insert 600 can have a planar rectangular frame shape having thicknesses as previously described with four sides 610, 620, 630 and 640. Through-holes 615, 625, 635, 645, can be located in the comer edges of the gasket insert 600. Referring to FIGS. 1 and 8, the gasket insert 600 can be inserted behind a conventional air vent cover 60, so that the mounting fasteners 65 for the vent cover 60 1match up to the through-holes 615, 625, 635, 645 of the gasket insert 600. Additionally, the gasket insert 600 can be placed on the outside of the vent cover 60. Although the gasket insert 600 is shown on a ceiling vent 60 mounted on a ceiling 8, the gasket insert 600 can be used with any air vent such as but not limited to wall vents, floor vents, and the like. In addition to deterring crawling arthropods from crawling through the vent cover louvers, and any openings about the cover, the novel gasket can also seal air leaks between the gasket cover and the surface on which it is being mounted.

FIG. 9 is an enlarged exploded view of the wall switch gasket insert 700 that can be used with the wall switch plate 70 shown in FIG. 1, and be mounted to a wall 6. The novel wall switch gasket insert 700 can include a planar rectangular shape 710 having similar exterior dimensions to that of the switch cover plate 72, and having thicknesses as previous described, with fastener opening through-holes 715 and toggle switch opening 717 which are sized to the same location as the fastener through-holes 75 and toggle switch opening 77 in the switch cover plate 72. Gasket insert 700 is sized so that cover plate 72 can fit over gasket insert 700 by being moved in the direction of arrow G1. By moving both the cover plate 72 and gasket rectangular shape 710 in the direction of arrow G2, the toggle switch 74 of the toggle switch case 76, can extend through toggle switch openings 717 and 77 of the novel gasket insert 700 and switch cover plate 70. The toggle switch case 76 can easily still fit in the, direction of arrow G3 within the wall switch housing 78. In addition to deterring crawling arthropods from crawling through any openings and cracks adjacent to a conventional switch cover plate, the novel gasket can also seal air leaks between the gasket cover and the surface on which it is being mounted so that an added insulation effect can also be achieved.

FIG. 10 is an enlarged exploded view of the telephone gasket insert 800 that can be used with the telephone wall plate 800 shown in FIG. 1 and be mounted to a wall 6. The novel wall switch gasket insert 800 can include a planar rectangular shape 810 having similar exterior dimensions to that of the telephone wall cover plate 82, and having thicknesses as previous described, with fastener opening through-holes 815 and telephone jack opening 817 which are sized to the same location as the fastener through-holes 81 and telephone jack opening 83 in the telephone cover plate 82. Telephone gasket insert 800 is sized so that telephone cover plate 82 fits over gasket insert 800 by being moved in the direction of arrow H1. By moving both the cover plate 82 and gasket rectangular shape 810 in the direction of arrow H2, the telephone jack 86 of the telephone jack case 86, lines up with jack openings 817 and 83 of the novel gasket insert 800 and telephone cover plate 80. In addition to deterring crawling arthropods from crawling through any openings and cracks adjacent to a conventional telephone jack cover plate, the novel gasket can also seal air leaks between the gasket cover and the surface on which it is being mounted so that an added insulation effect can also be achieved. Although this embodiment is described for telephone jack cover plates, this embodiment can function with cable type cover plates having other types of female connector slots with other types of cables such as those for modems, and the like.

FIG. 11 is an enlarged exploded view of the thermostat gasket insert 950 that can be used with the wall thermostat 95 shown in FIG. 1. A wall thermostat can have a rear surface 97 that is generally sized to fit against a wall surface 6. The novel gasket insert 950 can have a planar rectangular frame shape having thicknesses as previously described with four sides 960, 970, 980 and 990. Referring to FIGS. 1 and 11, the gasket insert 950 can be inserted behind a conventional wall thermostat 95, so that a seal substantially exists between the backing 97 of the thermostat 95 and the wall surface 6. Additionally, the gasket insert 950 can be placed on the outside and/or around the thermostat 95. In addition to deterring crawling arthropods from crawling through spaces, and any openings about the thermostat 95, the novel gasket can also seal air leaks and function as an extra insulator between the thermostat and the surface on which it is being mounted.

FIG. 12 is an exploded view of the electrical receptical gasket 850 that can be used with the electrical receptical 85 shown in FIG. 1 and be mounted to a wall 6. The novel wall switch gasket insert 850 can include a planar rectangular shape 860 having similar exterior dimensions to that of the electrical receptical cover plate 86, and having thicknesses as previous described, with fastener opening through-hole 865 and electrical receptical openings 867 which are sized to the same location as the fastener through-hole 89 and electrical receptical openings 867 in the receptical cover plate 86. Gasket insert 850 is sized so that cover plate 86 can fit over gasket insert 850 by being moved in the direction of arrow J1. By moving both the cover plate 86 and gasket rectangular shape 860 in the direction of arrow J2, the electrical recepticals 88 are accessible through openings 867 and 87 of the novel gasket insert 850 and cover plate 85. The electrical recepticals 88 can easily still fit in the direction of arrow J3 within the wall housing 88.5. In addition to deterring crawling arthropods from crawling through any openings and cracks adjacent to a conventional wall receptical cover plate, the novel gasket can also seal air leaks between the gasket cover and the surface on which it is being mounted so that an added insulation effect can also be achieved.

FIG. 13 is an enlarged exploded view of the cable wall gasket insert 900 that can be used with the cable wall plate 90 shown in FIG. 1. The novel wall switch gasket insert 900 can include a planar rectangular shape 910 having similar exterior dimensions to that of the cable wall cover plate 92, and having thicknesses as previous described, with fastener opening through-holes 917 and cable jack opening 915 which are sized to the same location as the fastener through-holes 91 and cable jack opening 93 in the cable cover plate 92. Cable gasket insert 900 is sized so that cable cover plate 92 fits over gasket insert 900 by being moved in the direction of arrow K1. By moving both the cover plate 92 and gasket rectangular shape 910 in the direction of arrow K2, the cable jack 94 of the cable jack case 94.5, lines up with jack openings 915 and 93 of the novel gasket insert 900 and cable cover plate 90. In addition to deterring crawling arthropods from crawling through any openings and cracks adjacent to a conventional cable jack cover plate, the novel gasket can also seal air leaks between the gasket cover and the surface on which it is being mounted so that an added insulation effect can also be achieved. Although this embodiment is described for cable jack type cover plates, this embodiment can function with any other type cover plates having other types of female connector slots.

The gasket insert devices 100, 200, 300, and/or 400, can be used with or without a pre-cut line from the central opening of the gasket to the outer end of the gasket inserts 100, 200, 300, 400. Additionally, additional pre-cut lines, cutouts and other openings such as those needed for any type of fasteners, and the like, can also be used with the invention gasket inserts.

The gasket devices can come in different colors, such as but not limited to black, white, grey, blue, green, yellow, silver covered, brass colored, with shiny surfaces, flat surface colors, and the like.

While some of the gasket inserts are described as being behind wall, floor and ceiling covers, the gaskets can be used on top of existing covers and attached thereto by conventional fasteners, such as existing screws, and/or other types of techniques such as peel and stick tape, and the like. Similarly, while some of the gaskets and gasket inserts are shown outside a wall, floor, and the like, the novel gaskets and gasket inserts can be behind walls, floors, ceilings, and the like, and vice versa.

Although the preferred embodiments describe using a repellant material such as permetherin directly molded into the barrier material, the invention can use other types of repellant substances, pesticide substances, and the like, and combinations thereof, and the like. While being a repellant is a preferred application, stronger substances such as active pesticides, and the like can be used for killing the arthropods directly and/or killing the arthropods over time. Additionally, the use of substances such as but not limited to slippery substances such as polytetraflurorethylene(Teflon) coatings, petroleum jelly, and the like, can be applied to the barrier material, and will also deter the crawling arthropods from entering the enclosed space.

The arthropod repellant substance can be directly molded into the gasket barrier material. Additionally, the repellant substance can be applied on one or both side surfaces by various techniques such as but not limited to painting it on, inserting a cartridge thereon, and the like.

While the embodiments are described for using pliable materials, the invention can alternatively, or in combination be composed of stiff or rigid material.

Although the embodiments describe gasket devices having exterior shapes that can be circular and rectangular, the embodiments can be used with different shapes such as but not limited to triangular, oblong, square, and the like, and be flat, concave, convex, embossed, and the like. Other configurations can include but not be limited to shapes as a wafer, a flap, a washer, a sheet, a plate, shelf, leaf, thimble, coating, grommet, foil, membrane, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A barrier device for obstructing entry travel routes into enclosed and semi-enclosed spaces, comprising:

a solid barrier material with no spaces and gaps, sized to fit adjacent to an attachment portion which is sized to fit between a fixture and a fixed-permanent surface in a room, the fixture including an attachment point between shower faucet handles and the surface portion, the barrier material substantially closing off a passageway along where crawling arthropods enter the room, the solid barrier material including a disc shape with a center through-hole therethrough for fitting adjacent to the attachment point between the shower faucet handles and the surface portion, and the fixed-permanent surface being selected from at least one of: a floor, wall, and ceiling; and a separate arthropod repellant substance associated with the solid barrier material for deterring the crawling arthropods from entering into the room along the passageway, the barrier material further preventing and blocking airflow from passing therethrough.

2. The barrier device of claim 1, wherein the fixed-permanent surface includes: a wall portion.

3. The barrier device of claim 1, wherein the fixed-permanent surface includes: a floor portion.

4. The barrier device of claim 1, wherein the fixed permanent surface includes: a ceiling portion.

5. The barrier device of claim 1, wherein the separate arthropod repellant substance is selected from at least one of: a repellant substance, a pesticide, and a slippery substance.

6. A barrier device for obstructing entry travel routes into enclosed and semi-enclosed spaces, comprising:

a solid barrier material with no spaces and gaps, sized to fit adjacent to an attachment portion which is sized to fit between a fixture and a fixed-permanent surface in a room, the fixture including an attachment point between a pipe and the surface portion, the barrier material having a conical shape with a center through-hole therethrough for fitting adjacent to the attachment point between the pipe and the surface portion, the barrier material substantially closing off a passageway along where crawling arthropods enter the room, the fixed-permanent surface being selected from at least one of: a floor, wall, and ceiling; and a separate arthropod repellant substance associated with the solid barrier material for deterring the crawling arthropods from entering into the room along the passageway, the barrier material further preventing and blocking airflow from passing therethrough.

7. The barrier device of claim 6, wherein the pipe includes: a drainline for a sink.

8. The barrier device of claim 6, wherein the pipe includes: an incoming waterline for a sink.

9. The barrier device of claim 6, wherein the pipe includes: a water line for a showerhead.

10. The barrier device of claim 6, wherein the center through-hole of the barrier material further includes:

a variable size opening for fitting about different pipe diameters.

11. A barrier device for obstructing entry travel routes into enclosed and semi-enclosed spaces, comprising:

a solid barrier material with no spaces and gaps, sized to fit adjacent to an attachment portion which is sized to fit between a fixture and a fixed-permanent surface in a room, the fixture including a stem extending into the room and the stem located between the surface portion and an electric powered fixture, the barrier material having a bell shape with a center through-hole therethrough for fitting about the stem, the barrier material substantially closing off a passageway along where crawling arthropods enter the room, the fixed-permanent surface being selected from at least one of: a floor, wall, and ceiling; and a separate arthropod repellant substance associated with the solid barrier material for deterring the crawling arthropods from entering into the room along the passageway, the barrier material further preventing and blocking airflow from passing therethrough.

12. The barrier device of claim 11, wherein the electric powered fixture includes: a ceiling fan.

13. The barrier device of claim 11, wherein the electrical powered fixture includes: a light.

14. The barrier device of claim 11, wherein the center through-hole of the barrier material further includes:

a variable size opening for fitting about different stem diameters.

15. A barrier device for obstructing entry travel routes into enclosed and semi-enclosed spaces, comprising:

a barrier material sized to fit adjacent to an attachment portion which is sized to fit between a fixture and a fixed-permanent surface in a room with a stem therebetween, the barrier material substantially closing off a passageway along where crawling arthropods can enter the room, the barrier material having a disc shape with a center through-hole therethrough with the stem of the fixture being inserted into the center through-hole of the disc shape barrier material; and an arthropod repellant substance associated with the barrier material for deterring the crawling arthropods from entering into the room along the passageway.

16. A barrier device for obstructing entry travel routes into enclosed and semi-enclosed spaces, comprising:

a barrier material sized to fit adjacent to an attachment portion which is sized to fit between a fixture and a fixed-permanent surface in a room with a conduit therebetween, the barrier material substantially closing off a passageway along where crawling arthropods can enter the room, the barrier material having a conical shape with a center through-hole therethrough with the conduit of the fixture being inserted into the center through-hole of the conical shape barrier material; and an arthropod repellant substance associated with the barrier material for deterring the crawling arthropods from entering into the room along the passageway.

17. A barrier device for obstructing entry travel routes into enclosed and semi-enclosed spaces, comprising:

a barrier material sized to fit adjacent to an attachment portion which is sized to fit between a fixture and a fixed-permanent surface in a room with a stem therebetween, the barrier material substantially closing off a passageway along where crawling arthropods can enter the room, the barrier material having a bell shape with a center through-hole therethrough with the stem of the fixture being inserted into the center through-hole of the bell shape of the barrier material; and an arthropod repellant substance associated with the barrier material for deterring the crawling arthropods from entering into the room along the passageway.

18. A barrier device for obstructing entry travel routes into enclosed and semi-enclosed spaces, comprising:

a barrier material sized to fit adjacent to an attachment portion which is sized to fit between a fixture and a fixed-permanent surface in a room with a conduit therebetween, the barrier material substantially closing off a passageway along where crawling arthropods can enter the room, the barrier material having a cup shape with a center through-hole therethrough with the conduit of the fixture being inserted into the center through-hole of the cup shape barrier material; and an arthropod repellant substance associated with the barrier material for deterring the crawling arthropods from entering into the room along the passageway.

19. A barrier device for obstructing entry travel routes into enclosed and semi-enclosed spaces, comprising:

a solid barrier material with no spaces and gaps, sized to fit adjacent to an attachment portion which is sized to fit between a fixture and a fixed-permanent surface in a room, the fixture including a drain receptical, the barrier material having a cup shaped insert having a center through-hole for fitting with the drain receptical, the barrier material substantially closing off a passageway along where crawling arthropods enter the room, the fixed-permanent surface being selected from at least one of: a floor, wall, and ceiling; and a separate arthropod repellant substance associated with the solid barrier material for deterring the crawling arthropods from entering into the room along the passageway, the barrier material further preventing and blocking airflow from passing therethrough.

* * * * *